United States Patent Office 3,239,549
Patented Mar. 8, 1966

3,239,549
ALKALI METAL AND QUATERNARY AMMONIUM
DOUBLE SALTS OF SILICIC ACID
Helmut Hans Wilhelm Weldes, Swarthmore, Pa., assignor to Philadelphia Quartz Company, Philadelphia, Pa., a corporation of Pennsylvania
No Drawing. Filed Aug. 22, 1960, Ser. No. 50,877
5 Claims. (Cl. 260—448.2)

INTRODUCTION

This invention generally relates to alkali metal quaternary ammonium silicates and methods for producing same. More specifically, this invention relates to alkali metal tetra alkanol ammonium silicates, either in the form of crystalline compounds or solutions.

BACKGROUND

The literature abounds with the disclosure of processes which involve two or more of the following reactants: ammonia, silica, alkali silicates, silicic acid, ammonium hydroxide, quaternary compounds, ethylene oxide, tetra alkanol ammonium hydroxide, etc. However, it will be noted from a review of this literature that there appears to be no indication in the published prior art of the formation of a double salt containing an alkali ion of the first group of the periodic table (e.g. sodium or potassium) and an organic ammonium cation (i.e. a quaternary ammonium compound and specifically a cation containing an alkanol group) precipitated as a crystalline silicate compound soluble in water.

THE INVENTION

This invention broadly relates to the production of crystalline quarternary nitrogen compounds having the general formula:

$$M_2O \cdot X(N_nR_p{}^s)_2O \cdot YSiO_2 \cdot ZH_2O$$

In the above formula:
M preferably represents an alkali metal and most preferably sodium or potassium or mixtures thereof;
N represents a nitrogen atom;
$n$ is a small integer; less than 10 and preferably less than five;
X, Y and Z represent numbers defining the relative amounts of each of the component parts of the compound. X is preferably between 0.5 and 1.5, Y is preferably between 2 and 10, and Z is preferably between 1 and 20, and wherein up to four R groups are associated with each N.
R represents alkyl radicals containing between about 1 and 20 carbon atoms;
$p$ is at least 4; indicating total R groups;
$s$ is an integer from 1 to $p$, indicating number of different types of R groups.

According to one specific embodiment the invention relates to the production of compounds having the formula:

$$M_2O \cdot X(NR^1R^2R^3R^4)_2O \cdot YSiO_2 \cdot ZH_2O$$

wherein M, N, X, Y and Z have the significances noted above and $R^1$, $R^2$, $R^3$ and $R^4$ represent alkyl radicals containing between about 1 and 20 carbon atoms. Here $p$ is 4 and $s$ is 4 but may be any number from 1 to 4 inclusive.

In general, it can be said that the compounds of this invention are derived from nitrogen bases with a dissociation constant greater than that of 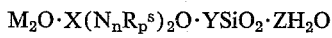 $NH_3(K=1.8\times10^{-5}$, $pK=4.74)$ and/or nitrogen bases which produce solutions with a pH of at least 9.

The compounds of this invention can be formed in a number of ways. One preferred method is to react a quaternary ammonium hydroxide with an alkali metal silicate. Examples of suitable quaternary ammonium hydroxides would include tetraethanol ammonium hydroxide, tetramethylammonium hydroxide, tetraethylammonium hydroxide, 2 tetrahydroxy ethyl piperazinium hydroxide, N,N'-bis-betahydroxy ethyl morpholinium hydroxide, N,N, N'-tris-(betahydroxyethyl)-N'-[tris-(beta-hydroxyethyl)ethylammonium] piperazinium hydroxide.

The products of the reaction with an individual tetra-alkanolammonium hydroxide have been shown to be substantially independent of the $SiO_2/Na_2O$ ratio of the soluble silicate used in the preparation. For instance, in the reaction between sodium silicate solutions and tetraethanolammonium hydroxide, crystals were prepared using sodium silicate solutions varying in per cent by weight ratio of $SiO_2/Na_2O$ from 2.0 to 3.75. The final product varied in mol ratio over the following range: $1.0Na_2O : 1.0-1.5N^+(C_2H_4OH)_4 : 3.0-3.8SiO_2 : 7.9-14.4H_2O$ 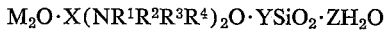 $(1Na_2O : 0.5 - 0.75[N(C_2H_4OH)_4]_2O : 3.0 - 3.8SiO_2 : 7.9 - 14.4H_2O)$. In some of these starting mixtures, potassium silicate was added to the sodium silicate without any essential change in the final product except that the alkali metal present was a mixture of sodium and potassium.

The reaction temperature has been varied from 25° C. to 150° C. but satisfactory products generally were not obtained at temperatures above about 100° C. Reaction time has been varied from 2 to 20 hours with some tendency for a lower ratio of the quaternary ion in the final product at the longer time limit.

Another method involves first reacting ammonium hydroxide and aqueous alkali metal silicate and either simultaneously or subsequently reacting therewith an alkylene oxide, such as ethylene oxide.

Still another method for forming somewhat more complex derivatives involves reacting an alkylene oxide, such as ethylene oxide, with ammonia derivatives, such as triethanolamine, tetrahydroxyethyl ethylene diamine, ethylamine, monoisopropanolamine, morpholine, various piperazine compounds, and various pyrrolidine compounds and then further reacting with an alkali metal silicate.

In the preparation of alkali metal tetra-alkanolammonium silicates, the following general rules are found to be important.

(1) The amount of alkali metal silicate should not be too high in the reaction mixtures. If it is increased above a reasonable upper limit, there is danger of gel formation and crystallization is slow. The isolation of the crystals becomes difficult because of the high viscosity of the mother liquor.

(2) The amount of water distilled off from the final reaction mixture is quite critical.

(3) The reaction temperature should be as low as possible, preferably room temperature or possibly lower. However, at temperatures much below room temperature, reaction time becomes unreasonably long.

(4) Small amounts of potassium salts increase the speed of crystallization considerably.

(5) The final solution supersaturates readily and therefore should be seeded and mechanical aids used for faster crystallization.

The ratio of silica to the combined alkali in the precipitated product can be increased by adding finely divided hydrated silica to the mixture. By this means the ratio of the $SiO_2$ in the precipitate has been raised from about 3.3 up to 9 or even higher on the mol basis (i.e. 6.6 to 18 $SiO_2$: quaternary ammonium oxide). Mixtures of tetraethanolammonium hydroxide and alkali metal oxide in silicate solutions are also possible by these procedures: For instance, a solution formed by mixing S–35 sodium silicate with a solution if sodium tetraethanol-ammonium silicate will have an $SiO_2:Na_2O$ ratio higher than that of S–35.

It should be noted here too that it is intended to include the intermediate solutions as part of this invention. They are used not only as a source of the quaternary ammonium silicate crystals, but may themselves be used in many of the same applications that will be described later. It is of particular importance that they represent solutions with a very high ratio of silica to inorganic alkali and they may be concentrated to a rather high solids content. For instance, the following table shows Stormer viscosity in centipoises (cp.) at 20° C.

| Sodium Tetraethanol Ammonium Silicate, percent by weight | Solids Content, percent by weight | Cp. |
|---|---|---|
| 63 | 46.1 | 48 |
| 59 | 43.2 | 29 |
| 56 | 41.0 | 20 |
| 53 | 38.8 | 14 |

These aqueous solutions also readily dissolve finely divided silica, such as Baker's analyzed silicic acid, a hydrated zerogel, or Quso (sold by Philadelphia Quartz Company), which is a hydrated precipitated silica, or Syloid–308 which is a finely divided silica gel sold by Davison Chemical Co., or Hi-Sil X–303 which is a hydrated precipitated silica sold by Columbia-Southern Chemical Co. These all may be dissolved in the above solutions at room temperature. (See Examples 6 and 8.) It was found that silica from silica gel dissolved in my sodium quaternary ammonium silicates is in a completely crystalloidal state, whereas such silica dissolved in a normal sodium silicate, such as "N" silicate is in a completely colloidal state. The difference was demonstrated by the reaction with ammonium molybdate solution which with crystalloidal silica in my solution develops a yellow color whereas no color was found in the sodium silicate solution.

The recation system for the preparation of these quaternary ammonium silicates involves a number of variables. First, there is the source of nitrogen (which may be ammonia or a more complex ammonium compound), ethylene oxide, an alkali silicate, and water. In addition, the effects of temperature and time are important. Thus, I have found that because of the high solubility of most of these quaternary ammonium alkali metal silicate compounds, the solutions need to be concentrated a great deal to induce crystallization. Secondly, as indicated above, I have found that lower temperatures tend to promote the proper reaction and, in general, I propose to use temperatures below 100° C. and preferably about room temperature, although with some reactants, it is necessary to carry out the preliminary steps at a higher temperature and in an autoclave. The effects of these variables have been outlined in general terms above and become more apparent in the following examples. It is to be noted also that the alkali metal silicate has a catalytic effect on the crystallization of the product and mixed alkali silicates seem to be even more effective as seen by the addition of small amounts of potassium silicate to reactions involving sodium silicate primarily.

The concentration of alkali metal silicate is also of great importance. Where a high concentration is present, the speed of crystallization is greatly reduced. Thus, when sufficient sodium silicate is present to bring about complete reaction of the ammonium compound, crystallization is quite slow. On the other hand, if rapid crystallization is to be attained, the concentration of the sodium silicate may be only 50% of that necessary for the complete reaction with the quaternary ammonium ion. The presence of a small amount of potassium silicate is helpful with these sodium silicate solutions when the maximum yield is desired.

PROPERTIES OF TETRAETHANOLAMMONIUM SILICATE CRYSTALS

This crystalline compound has the approximate ratio of $1M_2O : 1.4N^+(C_2H_4OH_4 : 3.8SiO_2 : 11H_2O(1M_2O : 07 [N(C_2H_4OH)_4]_2O:3.8SiO_2:11H_2O)$. It crystallizes from water in pseudo-cubic crystals which are either monoclinic or triclinic in crystal character. They are anisotropic and thus birefringent and they are either uniaxial or biaxial. Their refractive indices were found to be alpha=1.498, beta=1.506, and gamma=1.528.

The crystals have a density at 20°/20° of 1.604 and a melting point of 57–59° C. Softening begins at about 53° C. Solubility in water was found to be about 180 gms. in 100 ml. of water at 20° C. and 35.5 gms. in 100 ml. of water at 1.0° C. The crystals seem to be insoluble in all organic solvents. As indicated, the solubility rises rapidly as the temperature rises. Electrometric titration shows that this compound is a salt of a monobasic acid. It is either a double silicate salt or, if all the cationic groups can be combined as $R_2O$, the ratio appears to be $1R_2O:2.1–2.2SiO_2:7H_2O$ and the salt would be considered a disilicate. In the generalized formula $p$ equals 4, $s$ equals 1, $n$ equals 1.

A second crystalline product has the ratio of $1M_2O:0.6N^+(C_2H_4OH)_4:3.3SiO_2:8H_2O$
$(1M_2O:0.3[N(C_2H_4OH)_4]_2O:3.3SiO_2:8H_2O)$ It has a crystalline habit similar to the above-described silicate but a melting point at about 82–83° C. with softening beginning at 57° C. These crystals are also very soluble in water. When the cations are combined, the ratio appears to be $1R_2O:2.5SiO_2:6H_2O$.

EXAMPLES

A number of the materials used in the following examples are described as follows:

The alkali metal silicates, supplied by the Philadelphia Quartz Co., are characterized in the following table:

| Trademark | Ratio $Na_2O:SiO_2$, percent | $Na_2O$, percent | $SiO_2$ percent | $H_2O$, percent |
|---|---|---|---|---|
| S 35 | 1:3.75 | 6.75 | 25.3 | 67.9 |
| N | 1:3.22 | 8.90 | 28.7 | 62.4 |
| E | 1:3.22 | 8.60 | 27.7 | 63.6 |
| K | 1:2.90 | 11.00 | 31.9 | 57.0 |
| RU | 1:2.40 | 13.85 | 33.2 | 53.0 |
| D | 1:2.00 | 14.70 | 29.4 | 55.8 |
|  | $K_2O:SiO_2$ | $K_2O$ |  |  |
| Kasil #1 | 1:2.50 | 8.30 | 20.8 | 70.5 |

Ammonium hydroxide was the 28–30% aqueous reagent grade supplied by Allied Chemical Co.

Quso FF, a finely divided silica, also obtained as a trademarked product from the Philadelphia Quartz Company, has an ignited loss of 13.0%, with 7.2% of free water and 5.8% of bound water. It analyzed approximately 85% $SiO_2$, with a surface area of about 280 m.²/g.

Another form of silica was Syloid-308 supplied by the trademark owner Davison Chemical Company. This silica had an ignited loss of 4.0 and contained approximately 95% $SiO_2$, with a surface area of about 230 m.²/g.

A finely divided silica Hi-Sil X–303, supplied by the trademark owner Columbia-Southern Chemical Company, had an ignited loss of 8.5% and contained approximately 89.4% $SiO_2$, with a surface area of about 140 m.²/g.

The ethylene oxide with a purity of about 99.5% was supplied by Matheson Company, Inc.

Ethanolamines were supplied by the Union Carbide Chemicals Co. as pure liquids. These were monoethanolamine ($H_2NC_2H_4OH$), diethanolamine $HN(C_2H_4OH)_2$, triethanolamine $N(C_2H_4OH)_3$.

Tetraethanol ammonium hydroxide was supplied by Carbide & Carbon Chemicals Company in 1945 as an aqueous solution containing 40% tetraethanolammonium hydroxide (1.96 N), 12.16% $Na_2O$ and 0.29% $CO_2$ and by the R.S.A. Corporation of New York as a 40% methanolic solution.

Technical tetrahydroxy ethylene diamine was obtained from Visco Products Co.

Pyrrolidine, morpholine and propylene oxide came from Eastman Kodak Co. as 100% active, liquid. They also supplied tetramethylammonium hydroxide as an aqueous 10% solution.

N,N'-(2-dihydroxyethyl)-piperazine and N-2-amino ethyl piperazine were also from Union Carbide Chemicals Co.

ANALYTICAL PROCEDURES

In analyzing the alkali quaternary ammonium silicates, special procedures are necessary.

*Ignition loss.*—The ignition loss is determined with a sample of quaternary silicate weighing one gram. This sample is heated in a covered platinum crucible, raising the temperature very, very slowly. If the ignition is carried out too fast, silicon carbide forms and its is almost impossible to burn it off. Therefore the crucible is heated extremely slowly on one side until all of the organic matter has charred completely. This procedure takes about one hour, then the heat is increased slowly to the full blast of a Tirrel burner and continued until the sample has turned completely to either white powder or a clear white melt. This takes about two more hours. When the sample is white in color it is transferred to a Fisher burner and heated full blast for a further half-hour.

*Quaternary ammonium base.*—The nitrogen content is determined using the Kjeldahl procedure with special modifications as indicated. About 0.75 gms. of the silicate is taken as a sample. This sample is weighed into a 500 ml. round-bottom, two-necked flask, and 10 grams of dehydrated $K_2SO_4$ and 2 grams of dehydrated $CuSO_4$ are added thereto. After admixing 12 ml. of concentrated $H_2SO_4$, a reflux glass tube is set on top of the flask and the mixture heated over a wire gauze in a hood slowly and cautiously, close to the boiling point of the sulfuric acid. Heating is continued until the originally dark solution becomes clear and no dark specks remain. This digestion period takes between 3 to 24 hours, depending on the composition. After the contents are cooled to room temperature, 100 ml. distilled water is added carefully through the reflux tube while swirling the contents. Then a few Alundum boiling stones are added and a magnetic stirrer. The reflux glass tube is removed and the flask is connected to the distillation equipment. The end of the condenser dips into a receiver containing 100 ml. of distilled water with excess 0.2 normal HCl over the expected equivalent of ammonia. About 130 ml. of 6-normal sodium hydroxide are added to the reaction flask through a dropping funnel while stirring with a magnetic stirrer. When all of the sodium hydroxide is added, the reaction mixture is heated for an hour to vigorous boiling. The ammonia formed during the digestion is driven over into the acid solution and after completion the free hydrochloric acid is back titrated with 0.2-normal NaOH.

*Alkali metal determination.*—The gravimetric sodium determination is not satisfactory. It is recommended that sodium be determined as the difference between the total titratable alkali of the sodium tetraethanolammonium silicate and its quaternary nitrogen content determined by the Kjeldahl method just described.

A one gram sample is dissolved in 50 ml. of water and titrated with 0.2-N HCl against a methyl orange indicator. This gives the total titratable alkali. The $Na_2O$ is then found by calculating the amount of 0.2-N HCl necessary for the quaternary present and subtracting this value from the total titratable alkali. The difference gives the amount of 0.2-N HCl used by $Na_2O$. Of course, if potassium is present, this has to be subtracted from the total alkali calculated as $Na_2O$.

With potassium, the usual gravimetric procedure employing the residue after the ignited loss and removal of $SiO_2$ with HF is satisfactory. (Vail, Soluble Silicates, vol. I, p. 41.)

*Silica determination.*—Silica in solution may be determined using the usual volumetric method and the gravimetric method may be used for insoluble silica. (Vail, Soluble Silicates, vol. I, p. 40.)

Example 1

1767.2 parts of aqueous 40% tetraethanolammonium hydroxide solution were mixed with 1067 parts of "E" brand sodium silicate. When these solutions were mixed together, no precipitate was formed. The mixture was cooled and held in an automatic electric refrigerator without a fan at a temperature of approximately 2° C. Crystals began to form in about one day and continued to grow in number and size for about six days. The crystals were then filtered off, washed with alcohol and ether and dried in vacuo (15–30 mm. Hg) at a temperature of 40° C. The yield was 777.1 parts of crystals. The mother liquor was then returned to the refrigerator and, during an additional two-week period, 152.2 parts more crystals formed. These were separated by filtration and the mother liquor was then mixed with ethanol until no further precipitation occurred. The precipitate was separated by filtering on a Buchner funnel and washed and dried, leaving 176.5 parts of crystalline material. This total yield of 1105.8 parts was almost theoretical inasmuch as 1110 parts should be obtained according to calculation. The product was purified by dissolving it in water to which ethanol was added in a ratio of about 150 ml. of water to 20 ml. of ethanol. The aqueous solution was again placed in the refrigerator and allowed to recrystallize and the crystals were separated out and washed with alcohol and ether and then dried in vacuo at room temperature. About 60% was recovered.

The product had the following composition by analysis:

| | Percent |
|---|---|
| Ignited loss | 64.79 |
| $N^+(C_2H_4OH)_4$ | 33.91 |
| $H_2O$ | 30.93 |
| $SiO_2$ | 27.33 |
| $Na_2O$ | 8.11 |

This analysis represents a compound having the following molar proportions:

$1Na_2O:1.4N^+(C_2H_4OH)_4:3.8SiO_2:14.2H_2O$
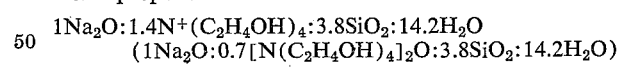

More dilute solutions than the 40% solution (1.9 molar) did not furnish crystals. For instance, 25.6 parts of the aqueous tetraethanolammonium hydroxide solution was mixed with 100 parts of distilled water, forming a 0.4 molar solution. To this was added a 0.4 molar solution of "E" sodium silicate solids (8.6 parts of "E" per 100 parts of $H_2O$). The final mixture was about 0.2 molar. No precipitation occurred even after storage for several days at a temperature of 2° C.

When one molar solutions were used, still no precipitation developed. Thus with tetraethanolammonium hydroxide solutions, near freezing solutions containing more than 11% tetraethanolammonium hydroxide and 3% "E" solids were required to initiate crystallization.

The following Table 1 shows the results of using sodium silicate solutions with a wide range of ratios. Attempts to prepare the tetraethanolammonium silicate using sodium metasilicate (ratio $1Na_2O:1SiO_2$) solutions were not successful.

It should be mentioned in connection with the lower portion of this table (showing a mixture of potassium silicate with different amounts of "E" silicate) that in the presence of potassium oxide, crystallization seemed to occur more readily and the rate of crystallization was in direct proportion to the amount of the potassium silicate in the mixture. The higher the content of Kasil #1 the faster the crystallization proceeded. Necessarily if some potassium silicate is present there will be potassium silicate in the final crystals in proportion to the relative amount present but the triple salt is a disilicate in the general ratio of $1M_2O:2SiO_2:4.5-5.5H_2O$ where $M_2O$ is ($Na_2O+K_2O$) in any combination with a major proportion of tetraethanolammonium ion expressed as $R_2O$.

When 10% of the silica in the reaction mixture was present as Kasil #1 potassium silicate, crystals formed in large quantities in a few hours compared with three days with no potassium silicate present. This was true whether the reaction proceeded with tetraethanolammonium hydroxide or was begun with more basic raw materials such as ethylene oxide in aqueous ammonia.

denser. 74 parts of ethylene oxide were added slowly through the gas inlet tube while the mixture was stirred vigorously. The exothermic reaction which started immediately made it necessary to cool the reaction vessel in order to hold the temperature of the contents between 25° and 30° C. Otherwise the internal temperature would rise to about 80° C. which would reduce the final yield.

After about a third of the ethylene oxide was added, the solution became turbid and a coacervate formed which became heavier as the final portions of the ethylene oxide were mixed in. During this period of about 45 minutes, the ethylene oxide was refluxed in the low temperature reflux condenser. This stopped as soon as all of the ethylene oxide had been incorporated.

Agitation was continued for about 2 hours at 25–30°

TABLE 1.—COMPOSITION OF ALKALI METAL TETRAETHANOLAMMONIUM SILICATES OBTAINED FROM DIFFERENT ALKALI METAL SILICATES AND TETRAETHANOLAMMONIUM HYDROXIDE

| Alkali Metal Silicate | Weight Percent Ratio $Na_2O:SiO_2$ | Reaction Product | | | | | | | |
|---|---|---|---|---|---|---|---|---|---|
| | | Analysis | | | | | Mole Ratio ($Na_2O+K_2O$)=1 | | |
| | | Percent $K_2O$ | Percent $Na_2O$ | Percent $N^+(C_2H_4OH)_4$ | Percent $SiO_2$ | Percent $H_2O$ | $[N(C_2H_4OH)_4]_2O$ | $SiO_2$ | $H_2O$ |
| "D" | 1:2.00 | | 8.38 | 32.96 | 28.09 | 30.19 | 0.65 | 3.5 | 12.4 |
| "RU" | 1:2.40 | | 10.23 | 31.96 | 29.59 | 27.29 | 0.50 | 3.0 | 9.2 |
| "K" | 1:2.90 | | 8.72 | 32.74 | 28.45 | 29.22 | 0.60 | 3.4 | 11.5 |
| "E" | 1:3.22 | | 8.11 | 33.91 | 27.33 | 30.93 | 0.70 | 3.8 | 14.2 |
| "S 35" | 1:3.75 | | 7.41 | 33.91 | 27.33 | 30.93 | 0.75 | 3.8 | 14.4 |
| | $K_2O:SiO_2$ | | | | | | | | |
| "Kasil #1" | 1:2.50 | 6.11 | 3.71 | 36.21 | 29.35 | 24.39 | 0.7 | 3.8 | 10.3 |
| Plus small amt. "E" | | 4.51 | 5.31 | 35.94 | 29.05 | 24.65 | 0.7 | 3.6 | 10.2 |
| Plus medium amt. "E" | | 3.14 | 6.62 | 36.02 | 29.44 | 24.47 | 0.65 | 3.5 | 9.7 |
| Plus larger amt. "E" | | 1.48 | 8.04 | 38.67 | 30.35 | 20.77 | 0.55 | 3.8 | 7.9 |

*Example 2*

A pure aqueous solution of tetraethanolammonium hydroxide was prepared by distilling off the methanol from a 40% methanolic solution (obtained from RSA Corporation) and dissolving the residue in water. In 200 parts of a 20% aqueous tetraethanolammonium hydroxide solution (prepared as described above) was dissolved 9 parts of NaOH. To this solution 30 parts of "Quso FF" was added and the mixture rotated on a ball mill for 36 hours at room temperature until most of the $SiO_2$ had dissolved. After centrifuging to separate undissolved material, 110 parts of water was distilled off in vacuo at 40° C. and the clear solution then refrigerated at 2° C. Crystals formed rather quickly and were filtered off after 2 days. They were washed with acetone and ether and dried in vacuo (15–30 mm. Hg; 40° C.) and were found to be similar to the ones obtained in Example 1.

Analysis:                                    Percent
  $SiO_2$ ------------------------------------- 31.62
  $N(C_2H_4OH)_4$ ---------------------------- 37.22
  $Na_2O$ ------------------------------------- 8.70
  $H_2O$ -------------------------------------- 21.89

Mole ratio:

$1Na_2O:1.37N^+(C_2H_4OH)_4:3.76SiO_2:8.7H_2O$
($1Na_2O:0.69[N(C_2H_4OH)_4]_2O:3.76SiO_2:8.7H_2O$)

*Example 3*

114 parts of the sodium silicate, "E," and 8 parts of the potassium silicate, "Kasil #1," were diluted with 300 parts of water and 24 parts of ammonium hydroxide solution.

The clear solution obtained from this mixture was poured into a vessel equipped with a stirrer, a thermometer, a gas inlet tube, and a low temperature reflux condenser.

C. until all of the coacervate had redissolved and a clear solution was reformed. Then the vessel was closed and held at room temperature overnight, i.e. 12–15 hrs. Following this period 290 parts of water were distilled off under a vacuum of about 15–20 mm. Hg at 35–40° C. This left a clear, rather viscous solution which was placed in the refrigerator of Example 1 at a temperature of 2° C. Crystals started to form very quickly and were filtered off after 12 hrs. The filtered crystals were washed with ethanol, then with ether and finally were dried in vacuo at 40° C.

The following Table II gives the results of this and similar reactions in which the concentration of "E" sodium silicate was varied from 108 parts to 228 parts and the concentration of Kasil #1 was varied from 0 to 16 parts. Ethylene oxide was varied from 74 to 100 parts. The reaction temperature was varied from 25 to 90° C. The reaction time was varied from 5 to 20 hours. Under these conditions the yield based on the silica varied from 25.1 to 53.5% and the yield based on the amine varied from 8.3 to 25.9%. In the final product the molecular ratio of the quaternary component with respect to the alkali oxide varied from 1.1:1.0 to 1.4:1.0 (from 0.55:1.0 to 0.7:1.0 on the basis of the quaternary oxide with respect to the alkali oxide). The molecular ratio of the silica with respect to the alkali oxide at 1.0 varied from 3.5 to 3.9 and the ratio of $H_2O$ varied from 9.4 to 13.5.

The starting mixture in each case contained 300 parts $H_2O$, 24 parts of 29% ammonia solution, and 74 parts ethylene oxide except in No. 10 where 100 parts of ethylene oxide were used. The quaternary in each case was $N^+(C_2H_4OH)_4$. Reactions 1 to 3 were carried out initially in an autoclave. In similar experiments carried out at 120 and 150° C. in the autoclave no crystallization resulted.

TABLE II.—$1(Na_2O+K_2O):1.4N^+(C_2H_4OH)_4:3.8SiO_2:11H_2O$

| Run No. | Solution, (Pts. by wt.) "E" | Solution, (Pts. by wt.) "Kasil" #1 | Reaction Temp. (°C.) | Reaction Time (hrs.) | Yield percent on— $SiO_2$ | Yield percent on— E.O. | Yield percent on— Amine | Reaction Product Analysis percent by wt. Quat | Reaction Product Analysis percent by wt. $SiO_2$ | Reaction Product Analysis percent by wt. $Na_2O$ | Reaction Product Analysis percent by wt. $K_2O$ | Reaction Product Molar Ratio $(Na_2O+K_2O)=1$ Quaternary Oxide | Reaction Product Molar Ratio $(Na_2O+K_2O)=1$ $SiO_2$ | Reaction Product Molar Ratio $(Na_2O+K_2O)=1$ $H_2O$ |
|---|---|---|---|---|---|---|---|---|---|---|---|---|---|---|
| 1 | 120 | | 90 | 10 | 26.7 | 13.5 | 13.5 | 35.87 | 29.56 | 8.46 | | 0.7 | 3.6 | 10.3 |
| 2 | 120 | | 90 | 5 | 31.1 | 16.2 | 16.2 | 33.88 | 27.07 | 7.88 | | 0.7 | 3.6 | 13.5 |
| 3 | 108 | 16 | 70 | 20 | 35.3 | 16.1 | 16.1 | 32.38 | 29.48 | 8.09 | 0.65 | 0.6 | 3.6 | 11.7 |
| 4 | 120 | | ² 80 | | 25.1 | 10.0 | 10.0 | 31.20 | 32.76 | 9.41 | | 0.55 | 3.6 | 9.5 |
| 5 | 120 | | ² 68 | | 30.2 | 12.4 | 12.7 | 31.76 | 32.09 | 9.21 | | 0.55 | 3.6 | 9.9 |
| 6 | 114 | 8 | ² 60 | | 44.8 | 21.5 | 21.5 | 34.57 | 29.92 | 8.34 | 0.40 | 0.65 | 3.9 | 11.0 |
| 7 | 114 | 8 | 25-30 | 19 | 53.5 | 25.5 | 25.5 | 34.29 | 29.90 | 8.66 | 0.31 | 0.65 | 3.5 | 9.9 |
| 8 | 114 | 8 | 25-30 | 19 | 49.4 | 25.9 | 25.9 | 34.54 | 27.37 | 7.84 | $(Na_2O+K_2O)$ | 0.7 | 3.6 | 13.1 |
| 9¹ | 228 | 16 | 25-30 | 6 | | | | | | | | | | |
| 10 | 114 | 8 | 25-30 | 19 | 17.7 | 8.3 | 8.3 | 34.16 | 30.41 | 9.24 | 0.23 | 0.6 | 3.8 | 9. |

¹ Large amounts of crystals formed but were difficult to separate.
² Max:
Quat=quaternary.
E.O.=Ethylene oxide.

Example 4

A series of experiments similar to those in Example 3 were carried out with 60 parts of triethanolamine using 21 parts of ethylene oxide in autoclave at 90° C. and 40 parts ethylene oxide in an open flask at the lower temperatures. The results are set forth in Table III.

TABLE III.—Na-TEA SILICATES WITH A RATIO OF $M_2O:N^+(C_2H_4OH)_4:SiO_2:H_2O::1:1.4:3.8:11$

| Reaction No. | Composition of starting Mixture in parts by wt. "E" | Composition of starting Mixture in parts by wt. "Kasil" #1 | Composition of starting Mixture in parts by wt. $H_2O$ | Reaction Temp., °C. | Reaction Time, Hrs. | Yield Percent based on $SiO_2$ | Yield Percent based on E.O. or amine | Analysis—percent by wt. Percent Quat* | Analysis—percent by wt. Percent $H_2O$ | Analysis—percent by wt. Percent $SiO_2$ | Analysis—percent by wt. Percent $Na_2O$ | Analysis—percent by wt. Percent $K_2O$ | Molar Ratio of $Na_2O+K_2O=1$ Quat* | Molar Ratio of $Na_2O+K_2O=1$ $SiO_2$ | Molar Ratio of $Na_2O+K_2O=1$ $H_2O$ |
|---|---|---|---|---|---|---|---|---|---|---|---|---|---|---|---|
| 11 | 120 | | 320 | 90 | 5 | 12.4 | 6.2 | 35.82 | 25.11 | 30.65 | 8.24 | | 0.7 | 3.8 | 10.5 |
| 12 | 120 | | 320 | 90 | 2 | 26.6 | 12.7 | 33.17 | 29.02 | 29.49 | 8.12 | | 0.65 | 3.8 | 12.3 |
| 13 | 228 | 16 | 300 | 70 | 20 | 24.9 | | | | 31.33 | | | | | |
| 14 | 228 | 16 | 300 | 25-30 | 19 | 31.8 | 29.2 | 32.67 | 28.84 | 29.50 | 8.32 | 0.28 | 0.6 | 3.6 | 11.7 |

*Quat=Quaternary.

Example 5

By varying the conditions of crystallization, a sodium tetraethanolammonium silicate with a lower ratio of organic base may be obtained. This compound has the formula $1Na_2O.6N^+(C_2H_4OH)_4:3.3SiO_2:8H_2O$ $(1Na_2O:0.3[N(C_2H_4OH)_4]_2O:3.3SiO_2:8H_2O)$ A mixture of 228 parts "E" sodium silicate and 16 parts "Kasil #1" potassium silicate was diluted with from 10 to 300 parts water and 24 parts of concentrated ammonium hydroxide solution (29% $NH_3$) were then added. While the reaction proceeded satisfactorily without potassium ion, its presence speeded up the reaction. The clear solution resulting was placed in a vessel equipped exactly as described in Example 4. 74 parts ethylene oxide were added slowly while the mixture was agitated vigorously and the reaction mixture was maintained between 25° and 30° C. by external cooling. A rather heavy coacervate formed increasing in viscosity as the amount of water present was reduced. The ethylene oxide was added over a period of 45 minutes and then the mixture was agitated at the same temperature until all of the coacervate had dissolved. Then the container was closed and kept at room temperature from 12 to 15 hours (overnight) to complete the reaction. The water which was added to dilute this silicate solution was distilled off and an additional 68 parts were distilled over. Thus while 300 parts water were added as stated above, 368 parts were distilled away. This left a viscous, clear solution which was cooled in an ice bath while being agitated vigorously with a stirrer. Crystals started to form quickly and within a few hours the whole mixture was converted to a semisolid crystalline mass. The mass was reslurried in 250 parts by volume of a solution consisting of 9 parts of acetone to 1 part of water. The slurry was then filtered and the crystals were washed with ethanol followed by ether, then dried in vacuo. The results of three tests are shown below:

TABLE IV

| | A | B | C |
|---|---|---|---|
| Yield: | | | |
| Percent based on $SiO_2$ | 98.6 | 86.3 | 84.8 |
| Percent based on ethylene oxide | 51.5 | 43.4 | 40.7 |
| Percent based on $NH_3$ | 51.5 | 43.4 | 40.7 |
| Analysis: | | | |
| Percent ign. loss | 51.14 | 53.38 | 50.00 |
| Percent $N^+(C_2H_4OH)_4$ | 23.04 | 21.01 | 21.34 |
| Percent $H_2O$ | 28.10 | 32.37 | 28.66 |
| Percent $SiO_2$ | 36.69 | 34.76 | 37.13 |
| Percent $Na_2O+K_2O$ (expressed as $Na_2O$) | 11.53 | 10.99 | 12.45 |
| Mol Ratio: | | | |
| $M_2O=(Na_2O+K_2O)$ | 1.0 | 1.0 | 1.0 |
| $N^+(C_2H_4OH)_4$ | 0.6 | 0.6 | 0.55 |
| $SiO_2$ | 3.3 | 3.3 | 3.1 |
| $H_2O$ | 8.4 | 10.1 | 8.0 |
| $[N(C_2H_4OH)_4]_2O$ | 0.3 | 0.3 | 0.28 |

Example 6

The solutions of sodium tetraethanolammonium silicate readily dissolve silicic acid in the form of hydrated silicas such as those already described.

For example, 50 parts sodium tetraethanolammonium silicate were dissolved in 50 parts of water forming a solution of 34.2% solids content. When 24 parts silicic acid of the Baker's analyzed type, for instance, were placed in the solution and revolved on a ball mill, most of the silica dissolved and the mixture set to a jelly-like material. 30 parts additional of water were added and ball-milling continued. After 5 additional hours the mixture was filtered and the solution was found to have a composition of 2.26% Na$_2$O, 9.71% quaternary ions, 19.27% SiO$_2$; the mol ratio was $$1Na_2O:1.4N^+(C_2H_4OH)_4:8.8SiO_2$$
$$(1Na_2O:0.7[N(C_2H_4OH)_4]_2O:8.8SiO_2)$$

A similar solution was made up by dissolving completely 14 parts of the silicic acid. This had a mol ratio of 1Na$_2$O:1.4 quaternary ion and 7SiO$_2$ (1Na$_2$O:0.7 quaternary ammonium oxide:7SiO$_2$). The solution had a solids content of 40.34%.

A solution of 80 parts of sodium tetraethanolammonium silicate was dissolved in 50 parts of water containing 17.0% SiO$_2$ resulting in a ratio of 1 Na$_2$O:1.4 quaternary ion:3.8 SiO$_2$ (1Na$_2$O:0.7 quaternary oxide:3.8 SiO$_2$). Sufficient finely divided silica was added to give a final ratio of Na$_2$O:SiO$_2$ of 1:4.2. After 5.5 hours on the ball mill at room temperature all of the Baker's silicic acid and the Quso had dissolved. When using Syloid-3.08 or Hi-Sil X-303 in place of Quso in other runs, it was necessary to continue a ball milling overnight. Each of these solutions was clear and found to have a ratio of 1Na$_2$O:1.4 quaternary ion:4.3 SiO$_2$ (1Na$_2$O:0.7 quaternary ammonium oxide:4.3SiO$_2$).

The solutions were placed in a refrigerator for six days at 2° C. The well-crysteallized precipitates were then isolated by filtration and washing with alcohol and ether and drying in vacuo as usual. The final product had a ratio of 1Na$_2$O:1.5 quaternary ion:4.2SiO$_2$:7.5H$_2$O (1Na$_2$O:0.75 quaternary ammonium $$oxide:4.2SiO_2:7.5H_2O)$$

*Example 7*

Crystals having a higher ratio of SiO$_2$ to M$_2$O were also obtained. 114 parts "E" sodium silicate and 8 parts "Kasil #1" potassium silicate were diluted with water (300 parts) and 24 parts concentrated ammonium hydroxide solution (containing 29% NH$_3$) were added forming a clear mixture which was placed in a glass flask with a stirrer, thermometer, reflux condenser and gas inlet tube. Ethylene oxide having a boiling point of 13–14° C. was weighed into another glass flask and connected with the gas inlet tube. The ethylene oxide was then driven over into the reaction mixture at a rate which would keep the temperature below 30° C. as shown in the following table.

| Time, minutes | Temp., ° C. (inside flask) | Comments |
| --- | --- | --- |
| 0 | 24 | Start, clear solution, ethylene oxide warmed to 25° C, immediately. |
| 4 | 25.5 | Refluxing slowly. |
| 7 | 27 | Refluxing slowly, reaction mixture cooled. |
| 13 | 27.5 | Refluxing faster, slight coacervation. |
| 25 | 28 | Refluxing, coacervation heavier. |
| 49 | 27.5 | Refluxing very slowly, all ethylene oxide had passed over. |
| 93 | 27 | Refluxing stopped, coacervate dissolving. |
| 120 | 26 | All coacervate dissolved, hazy solution. |
| 170 | 26 | All coacervate dissolved, clear solution. |
| 480 | 27.25 | Clear solution, odor of ethylene oxide remained. |

The reaction was continued for 8 hours and it was found that the temperature would still rise if the cooling bath was removed. A strong odor of ethylene oxide was still perceptible as indicated in the table. Therefore the reaction vessel was closed and the mixture kept at room temperature overnight. At that time the odor of ethylene oxide had disappeared and the water was distilled off the mixture so that only 3% of the added water remained. The clear solution was seeded and placed in the refrigerator at 2° C. for 24 hours. Since no crystals formed, the remainder of the added water was distilled off, plus 32 parts of the water from the sodium silicate solution, the mixture was still clear and viscous and crystals formed very quickly on refrigeration at 2° C. The whole bottle was filled with a mass of crystals within 24 hours. These were filtered off after 3 days and washed with acetone and ether and dried in vacuo as usual. The yield was 49.4% based on SiO$_2$ and 52.2% based on the ammonia with 51.8% based on the ethylene oxide. The product had the formula $$1(Na_2O+K_2O):1.4N^+(C_2H_4OH)_4:3.6SiO_2:13H_2O$$
(1M$_2$O:0.7 quaternary ammonium oxide:
$$3.6SiO_2:13H_2O)$$

On further concentration of the mother liquor no more crystals were obtained.

The above procedure was repeated except that 10 gms. of the finely divided silica "Quso" was mixed with the alkali silicates at the start of the reaction. It was found that the finely divided silica did not dissolve to any great extent until the tetraethanolammonium silicate solution was formed.

| Time, minutes | Temp., ° C. (inside flask) | Comments |
| --- | --- | --- |
| 0 | 26 | Start, solution cloudy from finely divided silica. |
| 14 | 27 | Refluxing, reaction flask cooled. |
| 24 | 27 | Refluxing, coacervate started to form. |
| 29 | 28 | Refluxing, heavy coacervate. |
| 52 | 28.5 | Refluxing, all ethylene oxide over. |
| 108 | 27.5 | Refluxing stopped, coacervate dissolving. |
| 146 | 26.5 | Coacervate disappeared, cloudy solution with some sudsing. |
| 331 | 26.5 | Solution still cloudy from undissolved finely divided silica. |

The mixture was then ball milled overnight and the finely divided silica dissolved leaving a slightly hazy solution. This solution was filtered and then 96% of the added 300 parts water was distilled off leaving a very viscous solution, with very slight amounts of gel, which readily redissolved. This solution was refrigerated at 2° C. and the crystals formed rapidly. Within a few hours the whole solution was white. After 3 days the crystals were filtered off; they filtered very easily although the mixture was quite viscous. The crystals were washed with acetone and ether and dried in vacuo as usual.

The yield was 51.6% based on the silica, 65.0% on the ethylene oxide and 65.4% on the ammonia. The crystals had the formula $$1(Na_2O+K_2O):1.5N^+(C_2H_4OH)_4:4.0SiO_2:13H_2O$$
(M$_2$O:0.7 quaternary ammonium
$$oxide:4.0SiO_2:13H_2O)$$

*Example 8*

A high ratio solution was formed by first dissolving 50 parts of sodium tetraethanolammonium silicate of the normal type having a ratio of 1:1.5:4.0:13.3 (1 Na$_2$O:0.75 quaternary ammonium oxide:4.0SiO$_2$:13.3H$_2$O) in 50 parts water. This dissolved completely. Then 20.7 parts of finely divided silica (Quso) was added and mixed on the ball mill for 36 hours at room temperature. A small amount of undissolved residue was centrifuged off and the solution was concentrated to a viscosity of about 2 poises by removing the water in vacuo at 40° C.

The final solution had a mol ratio of $$1Na_2O:1.5N^+(C_2H_4OH)_4:8.8SiO_2$$

(1Na$_2$O:0.75 quaternary ammonium oxide:8.8SiO$_2$) and contained 67.1% H$_2$O. The Stormer viscosity at 20° C. was 62.7 sec.

There are a number of possibilities of forming solutions with even higher proportions of silica to inorganic alkali. Solutions entirely free of sodium or potassium or other inorganic alkali may also be prepared. It is obvious, for instance, that using the proper base exchange resins, sodium and potassium may be removed from the solution of the tetraethanolammonium silicate leaving the alkali-free tetraethanolammonium silicate.

Another means of forming a sodium-free organic alkali silicate is to minimize the soluble alkali metal silicate present and increase the amount of silica present through the solution of silica gel or from other forms of silica soluble in the organic alkali.

It is also advantageous at times to increase the ratio of $SiO_2$ to $M_2O$ where M stands for inorganic alkali metal by mixing solutions of the soluble silicates with those of the quaternary ammonium silicates such as sodium tetraethanolammonium silicate. Where the organic silicate has a ratio of 8 or more $SiO_2$ to one of $Na_2O$, the ratio in solution can be increased considerably over that of the ordinary soluble silicate solution.

*Example 9*

A number of quaternary ammonium compounds more complex than the tetraethanolammonium hydroxide may be used to react with dispersions of silica gel or solution of soluble alkali silicate to form complex organic silicates in which all of the sodium is displaced. It is possible, for instance to use 150 parts "E" silicate, 300 parts water, and 60 parts of tetrahydroxy ethyl ethylenediamine in solution. 23 parts of ethylene oxide was added as in previous examples. After 12 minutes the temperature was 28° C., no refluxing was occurring but the vessel was cooled. After 24 minutes the temperature was still 27° C. and the solution was somewhat more hazy. By 30 minutes all of the ethylene oxide had passed over and the temperature was 26° C. The solution was clear in 2.5 hours, and at 6 hours 14 minutes the temperature was still 25.5° C. with no odor of ethylene oxide. 96% of the 300 parts water were distilled away leaving a viscous turbid solution which separated into two layers when left in the refrigerator at 2° C. 30 parts water were added again which allowed the mixture to form a homogeneous solution and on refrigeration cube-like crystals of sodium hexahydroxyethyl ethylene diammonium silicate formed slowly.

*Example 10*

The methods of preparing tetraethanolammonium hydroxide which involve the preparation of a salt and its subsequent reaction with barium or silver or similar hydroxide to form an insoluble residue which can be separated from the final organic hydroxide are known. It is possible to prepare a pure tetraethanolammonium hydroxide directly from ammonia and ethylene oxide using an alkali silicate as a catalyst. Thus, a mixture of 10 parts of "E" sodium silicate as catalyst was made with 300 parts of water and 24 parts of concentrated ammonium hydroxide solution containing 29% $NH_3$. These were mixed in an open flask with a reflux condenser and the reaction was allowed to proceed at its own rate with the ethylene oxide added gradually to the reaction mixture at room temperature. The temperature at the start was 24° C. and the solution was clear. In six minutes at 25° C., the ethylene oxide had also warmed to 25° C. and was being added slowly. Two minutes later, the temperature rose to 27° without any refluxing occurring. At nine minutes, the temperature was 28° C. and although no refluxing was occurring, the reaction mixture was kept cool by cooling the outside of the flask. At 12 minutes, the temperature was still 28° C. At 17 minutes, the temperature had risen a half a degree and the mixture was refluxing very slowly. At 46 minutes, the temperature was 28° C. and all the ethylene oxide had goine over into the mixture which was clear. At 72 minutes refluxing had stopped but the temperature was the same. After 6.25 hours, the temperature was 26° C. and the reaction had stopped. There was still odor of ammonia, but neither ammonia nor ethylene oxide could be detected the next morning. The solution was then distilled in a vacuum of 16 mm. of mercury until 312 parts of water was lost and distillation was continued at about three mm. Hg with a loss of 2.3 parts of water. The remaining 92 parts was a clear and highly viscous solution. Four hundred and forty parts by volume of methanol were added and mixed in well and left over the weekend. Precipitated material was filtered off and the solution was made up to 500 parts by volume with methanol and titrated electrometrically. The clear and highly viscous oil was found to consist of about 41% of tetraethanolammonium hydroxide and 28% of triethanol amine. It is thus possible to prepare a pure tetraethanolammonium hydroxide quite cheaply in this manner by removing the amine and the solution will dissolve silica, with the preparation of tetraethanolammonium silicate if desired.

*Example 11*

Potassium tetraethanolammonium silicate was prepared by treating a solution of 160 parts "Kasil #1" potassium silicate solution with 300 parts of water and 24 parts of concentrated ammonium hydroxide solution. This formed a clear solution at 25° C. in the usual apparatus consisting of a glass flask, reflux condenser, thermometer and stirrer. The ethylene oxide was allowed to enter gradually into the solution. Eight minutes later the temperature was 28° C. No refluxing had occurred, but the solution was cooled from the outside. No coacervation developed. In 55 minutes, the temperature was 28.5°, with no refluxing occurring and all of the ethylene oxide had been taken up by the solution. In seven hours, the temperature was 25° C. and the reaction was discontinued. It is noted that in comparison with the sodium silicate solution, no coacervate developed and refluxing of the ethylene oxide occurred. Three hundred and thirty-four parts of water were distilled off and the remainder placed in the refrigerator at 2° C. and allowed to stand.

The crystals which formed rapidly were isolated after 8 days by filtering, washing with acetone and ether and drying in vacuo. The yield was 42.4% based on $SiO_2$ and 49.1% on ethylene oxide or $NH_3$.

These crystals had the molar ratio of $$1K_2O : 1.7 N^+(C_2H_4OH)_4 : 4.4$$

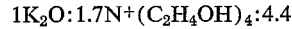

$SiO_2 : 8H_2O$ ($1K_2O : 0.85$ quaternary ammonium oxide: $4.4 SiO_2 : 8H_2O$) and had refractive indices of alpha=1.494, beta=1.498, gamma=1.502. The unrefined crystals softened at 64° C. and melted at 76–77° C. They were soluble in water, but insoluble in the ordinary organic solvents.

*Example 12*

It is evident that this reaction can be carried out with ethylene oxide and either ammonia or any of the other water miscible amines. For instance, in one reaction, 140 parts of "E" sodium silicate was diluted with 300 parts of water and 10 parts ethylamine was added. Thirty-two parts of ethlyene oxide was allowed to run into the reaction flask with the temperature controlled as usual. It was noteworthy that during this reaction no coacervate formed and when the reaction was complete, 295 parts of water was distilled off. It was found that on cooling, two layers appeared and it was necessary to return 20 parts of water to the solution, after which crystals formed slowly on standing.

*Example 13*

It is possible to obtain 100% yield based on silica, if the inorganic alkali silicate employed has a ratio corresponding to that of the final tetraethanolammonium silicate. Thus, 250 parts of "S–35" sodium silicate was diluted with 300 parts of water and mixed with 24 parts of concentrated ammonium hydroxide containing 29% $NH_3$. To this was added 16 parts of "Kasil #1" as a catalyst to speed up the formation of crystals.

The reaction was again carried out at 25–30° C. in the reaction flask with 74 parts of ethylene oxide allowed to enter the reaction slowly in order to control the reaction temperature. At the same time, the flask was cooled externally. In this way, a clear reaction solution was obtained and 414 parts of water were distilled off, leaving a viscous clear liquid. This was agitated in an ice bath for six hours. During this time, it turned into a semi-solid crystalline mass which was dried in a vacuum desiccator for 30 hours.

The crystalline material was ground and anlyzed, showing 100% yield based on $SiO_2$ and 84.5% based on either ethylene oxide or ammonia. The final ratio was $1(Na_2O+K_2O):1.22N^+(C_2H_4OH)_4$:
$3.86SiO_2:8.28H_2O(1M_2O:0.61$ quaternary ammonium oxide:$3.86SiO_2:8.28H_2O$).

Similar reaction mixtures have been prepared and the product formed by spray drying the solution instead of allowing it to crystallize in a cake. In this way, the necessity of grinding the cake was avoided.

In one such case the amount of dilution water was sharply reduced to 60 parts in the formula given above (Example 13). The preparation and crystallization of this mixture was carried out satisfactorily and the mass was spray dried using a ring type nozzle with six openings around the center, placed at the top of a 3 foot 2 inch conventional spray drier. (A fluid atomizing research type spray drier from the Swenson Corp. of Harvey, Illinois.) Best results were obtained with an air inlet temperature of 420–430° C. and an outlet temperature of 80–90° C. The atomizing air pressure was 75 p.s.i. and the slurry pressure was 50 p.s.i. 69 parts of product was obtained having the formula $1M_2O:1.3$ tetraethanol-ammonium ion:$3.9SiO_2:3.3H_2O(1M_2O:0.65$ tetraethanol-ammonium oxide:$3.9SiO_2:3.3H_2O$). The lower water content is probably related to the higher melting point which was found to be 108° C. The product decomposed at 173° C.

*Example 14*

Monoisopropanolamine will react with ethylene oxide in this reaction. For instance, a mixture of 30 parts of monoisopropanolamine was dissolved in 300 parts of water and 228 parts of "E" sodium silicate. To this was added 16 parts of "Kasil #1" potassium silicate and the reaction was carried out as before in the flask at about 25–30° C. The 53 parts of ethylene oxide were added slowly with cooling of the reaction mixture. No refluxing occurred, but after about a half hour, a heavy coacervate formed. The ethylene oxide was added in the course of about one hour and in about six hours all the coacervate had dissolved. No ethylene oxide odor could be detected after standing overnight and then 189 parts of water were distilled off, leaving a clear solution. It was necessary to return 20 parts of water to maintain a single homogeneous solution in the refrigerator at 2° C.

Similarly, a solution may be formed by the reaction between propylene oxide and triisopropanolamine. In this case, 76.5 parts of triisopropanolamine were mixed with 600 parts of water and 120 parts of "E" sodium silicate, forming a clear solution to which the propylene oxide was added drop-wise at room temperature. A large amount of coacervate formed in the mixture overnight and it was necessary to continue the reaction much longer since the propylene oxide could still be detected.

*Example 15*

A sodium-N,N-bis-beta-hydroxyethylmorpholinium silicate may be formed by the reaction of ethylene oxide with morpholine. In the presence of the alkali silicate, the ethylene oxide adds to the imine group forming two ethanol side chains. This is a tetraethanolammonium hydroxide in which two OH groups have condensed with the loss of water, forming a morpholine ring.

In this case, 114 parts of "E" sodium silicate were mixed with 8 parts of "Kasil #1" potassium silicate in 300 parts of water and 35 parts of morpholine. This formed a clear solution and reaction started at 24° C. Cooling was started after 9 minutes when the temperature reached 28° C. and coacervation started at about 14 minutes and 30° C. In 35 minutes, all of the ethylene oxide had been passed into the solution and the temperature was 26.5° C. No refluxing occurred during this time. In 5.75 hours, the temperature was 23° C. The solution was clear. All coacervate had dissolved and there was no remaining odor of ethylene oxide.

Two hundred and 70 parts of water were distilled off to the point at which the reaction mixture became cloudy. This mixture separated into two layers on cooling, but in two days crystals started to form at the interface between layers and the mixture was accordingly stirred in an ice bath for seven hours. Thus, a large amount of crystals formed which were filtered off and washed and dried as usual, using ethanol and ether and a vacuum drier. The yield was 27% based on silica and 14% based on the ethylene oxide or morpholine.

This product had the molar ratio of $1(Na_2O+K_2O):1.15$ morpholine complex:$3.23SiO_2:12.1H_2O(1M_2O:0.58$ morpholine complex oxide:$3.23SiO_2:12.1H_2O$). The crystals were semi-cubic and had the indices of refraction alpha=1.494, beta=1.498 and gamma=1.502. The recrystallized product melted at 62–64° C. but began to soften at about 55° C. It was quite soluble in water, but not in the usual organic solvents.

*Example 16*

A sodium-N,N,N′,N′-tetra-(2-hydroxyethyl)-piperazinium silicate was formed using N,N′-(2-di-hydroxyethyl)-piperazine. In this reaction, in the presence of the sodium silicate, ethylene oxide adds on to each nitrogen in the piperazine ring forming a quaternary ethanol compound. Thus, it is a derivative of tetraethanolammonium hydroxide in which two of the tetraethanolammonium hydroxy compounds are combined by the loss of $4CH_2OH$.

In this reaction, 70 parts of the piperazine compound was dissolved in 300 parts of water with 240 parts of "E" sodium silicate. A heavy coacervate formed, but the mixture was treated as usual at 25–30° C. with 36 parts of ethylene oxide allowed to pass gradually into the reaction flask. In six minutes, the temperature had risen to 22.5° C. from 21° C., with an increase in coacervation. After 50 minutes, the temperature was 27° C. inside the flask and all of the ethylene oxide had been taken up. In one hour and 16 minutes, the temperature was 26.5° C. and the solution had become clear. In five hours, the temperature was 25° C. and the reaction was shut off and the flask left closed at room temperature overnight. There was no odor of ethylene oxide and crystals had formed on the bottom of the flask. On further refrigeration, a large number of crystals formed in a few hours. These were easily filtered and washed with ethanol and then washed twice with ether and dried in vacuo. The yield was about 7% based on the silica and 6.6% based on ethylene oxide or the piperazine. The mol ratio was $1Na_2O:2.2$ quaternary complex: $6.4SiO_2:19.3H_2O$. (The mole ratio for the oxide is the same as for the complex in this case.) These crystals were elongated plates being strongly birefringent and having the refractive indices alpha=1.506, beta=1.512 and gamma=1.520. The crystals softened at about 104° C. and melted with decomposition at 110–111° C. They were fairly insoluble in water and quite insoluble in the usual organic solvents.

This product contained an exceptionally low amount of $Na_2O$ as shown below and by continued washing with water, the $Na_2O$ content may be reduced below 1%.

|  | Before Washing | After Additional Washing (10X) |
| --- | --- | --- |
| Percent $Na_2O$ | 4.50 | 0.09 |
| Percent Quaternary ion | 42.50 | 35.31 |
| Percent $SiO_2$ | 28.00 | 26.41 |
| Percent $H_2O$ | 25.36 | 37.54 |

17

I have also carried out essentially the same reaction starting with piperazine itself and forming ethanol groups by reaction with ethylene oxide. The final compound was the same.

*Example 17*

Sodium - N,N,N'- tris - beta-hydroxyethyl-N'-tris-(beta-hydroxyethyl)-ethylammonium-piperazinium silicate was prepared using N-2-aminoethyl-piperazine. This again may be considered a derivative of tetraethanolammonium hydroxide in the same sense as the previous piperazine but in this case an additional tetraethanolammonium compound is combined with one of the ring nitrogens.

Fifty parts of the piperazine were dissolved in 300 parts of water and mixed with 240 parts of "E" sodium silicate. This formed a clear solution which was treated at about 25–30° C. as usual with 53 parts of ethylene oxide. After 8 minutes it had risen to 28.5° C. with a coacervate forming but refluxing as the ethylene oxide was slowly added. After 18 minutes the temperature had risen to 33° C. showing a very strong exothermic reaction which had to be cooled with ice. More coacervate formed but no refluxing occurred. After 25 minutes the temperature was down to 25° C. and a heavy coacervate was present. At this time cooling with water was all that was required. After one hour the temperature was 28° C. and no refluxing was occurring. All the ethylene oxide had been added and the coacervate was dissolving. In six hours the temperature was 25.5° C. and the solution was clear. This clear solution was left in the refrigerator at 2° C. overnight without further concentration. Since no crystals formed, an additional 53 parts of ethylene oxide were added. No refluxing and no coacervation occurred and the ethylene oxide was added in 1 hour, 10 minutes. The reaction was left for 5 hours more, leaving a clear solution with a strong odor of ethylene oxide. No crystals formed when this solution cooled overnight. 173 parts of water were distilled off and the concentrated solution was again cooled. At this time a fairly large amount of irregular crystals formed which were easily filtered and washed twice with ethanol, twice with ether, and dried in vacuo.

The yield was 13.1% based on the silica and 15.8% based on either the ethylene oxide or the piperazine. The crystals had a mol ratio of $1Na_2O:1.3$ quaternary complexion:$4.7SiO_2:11.9H_2O$ ($1Na_2O:1.9$ quaternary ammonium complex oxide:$4.7SiO_2:11.9H_2O$). They were diamond shaped in habit and had refractive indices of alpha=1.502, beta=1.512, gamma=1.520.

The crystals softened at 55° C. and melted at 64–65° C. without decomposition. They dissolved readily in small amounts of water but not completely in larger amounts. They were insoluble in the usual organic solvents.

In the analysis of these crystals it is necessary to know which nitrogen compounds are titratable as $Na_2O$ is calculated from the determination of nitrogen and total titratable alkali. Thus only two of the three nitrogens in the N-2-amino-ethyl-piperazine can be titrated with HCl. In the other compounds all of the nitrogen was titratable.

*Example 18*

Pyrrolidine is another heterocyclic nitrogen compound similar in structure to piperazine. A reaction was carried out as usual using 23.5 parts of pyrrolidine dissolved in 250.0 parts of water and mixed with 200.0 parts of "E" sodium silicate. 29.5 parts of ethylene oxide were added to this solution carefully at a temperature between 25 and 30° C. in the usual reaction flask. The clear yellow solution started at 27° C. and in six minutes had risen to 28.5° C. without any evidence of refluxing and any coacervation. The reaction mixture was cooled with water. After 29 minutes the temperature of the reactants was 28° C. and all of the ethylene oxide had been added, the solution was still clear and no refluxing had occurred. After 5.5 hours, with the temperature at 23° C. the reaction was stopped. The clear yellow solution had a strong odor of pyrrolidine. Since no crystallization occurred on cooling overnight, 218 parts of water were distilled off and the concentrated solution was again cooled in the refrigerator overnight at 2° C. No separation occurred on long standing.

*Example 19*

A double salt of sodium and tetramethylammonium silicate was prepared using a technique very similar to the one described in Example 1. 20.6 parts of "E" silicate were run into 27.7 parts of an agitated 10% aqueous tetramethylammonium hydroxide solution at room temperature. The resulting clear solution was concentrated in vacuo at 40° C. After 15.2 parts of $H_2O$ were distilled off, the clear residual solution was refrigerated at 2° C. over-night. A lot of crystals had formed which were filtered on a Buchner funnel, washed twice with acetone and ether, and dried in vacuo at 40° C.

The yield was 4.6 parts. The crystals had a mol ratio of

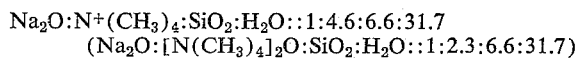

$(Na_2O:[N(CH_3)_4]_2O:SiO_2:H_2O::1:2.3:6.6:31.7)$

They are birefringent and seem to have a strong cleavage in one direction. The refractive indices were determined to be alpha=less than 1.450, beta=less than 1.460, gamma=1.466. The material softens at 145–147° C. and melts sharply at 158–159° C. It is very soluble in water and insoluble in acetone, ether or methanol, and decomposed by ethanol.

If the quaternary is expressed as $R_2O$ and the mol ratio for $Na_2O+R_2O=M_2O$ is calculated, then

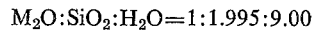

water, showing that this material is a desilicate as are all the others.

*Example 20*

In this example a pure quaternary ammonium silicate free from inorganic alkali was formed by removing the sodium from the product of Example 13. This product had been separated by crystallization and filtration, rather than by spray drying.

In order to carry out this separation, I obtained a highly cross-linked polystyrene nuclear sulfonic acid type cation exchanger, known as Amberlite 124, from Rohm & Haas Co. This was in the sodium form and had an exchange capacity of 2.1 meq./ml. of wet resin. This was converted to the H-form by treating it with an excess of 0.5 N HCl and washing it free from excess hydrogen with de-ionized water. 47.6 ml. of this hydrogen form of the resin was put in a column with a diameter of 1.7 cm. and then a solution of 10 grams of the sodium tetraethanolammonium silicate from Example 13 dissolved in 1 liter of water was run through the column very rapidly. The column was then regenerated with 300 ml. of 0.5 N HCl. In this way the resin was saturated with quaternary ion and sensitized for the absorption of sodium ion only.

With the column so prepared, 30 grams of the same sodium tetraethanolammonium silicate was dissolved in 200 ml. of water, and this was run through the column as fast as possible which took about 3 minutes. The effluent was distilled in vacuo at 40° C. until a very viscous, oily material was left. This had an ignition loss of 78.22% with 15.05% as the quaternary ion, $H_2O$ by difference was 63.17% and the silica content was 20.06%. The $Na_2O$ content was 1.07% so that a fairly pure tetraethanolammonium silicate had been formed which did not crystallize readily, even on refrigeration.

*Example 21*

In Example 20 the preparation of a pure tetraethanolammonium silicate by removal of sodium by base exchange was described. It is also possible to form such pure organic silicates by reaction of ammonia and ethylene oxide and a finely divided silica, such as Quso-FF or a colloidal sol, such as Ludox, from E. I. du Pont de Nemours, Inc.

Moreover, since more than a trace of silica is required to bring about the reaction for the formation of the tetraethanolammonium silicate, it does appear that the silica enters into the reaction and that it is not a mere formation of the tetraethanolammonium hydroxide with a subsequent solution of the silica present. Thus I appear to have a new process and a new product.

These examples show that the reaction between ammonia and ethylene oxide occurs in the presence of silica either as a finely divided solid or as an alkali free sol. The product obtained with the finely divided silica, Quso, is a quaternary silicate containing a quaternary of an unexpectedly high molecular weight. It is an oil, soluble in water and methanol, but insoluble in other common organic solvents. Solutions containing 10 to 15% $SiO_2$ can be prepared in this way. The reaction with the colloidal silica sol Ludox leads to a quaternary ammonium silicate also practically free of inorganic alkali but with the low molecular weight tetraethanolammonium quaternary ion. This is obtained with good yield provided the silica is present in a substantial amount. The oily material obtained from this reaction is soluble in water. Additionally, the product of the sol reaction contains a larger amount of colloidal silica than crystalloidal silica but on standing the colloidal silica tends to change over into the crystalloidal form and the opalescence of the solution becomes less.

In an example, finely divided silica, Quso-FF, was used in the following formula:

550 grams of water were blended with 79 grams of Quso-FF and then with 24 grams of aqueous ammonia (29%). This blend was poured into a 1 liter autoclave equipped with a stirrer and connected to a low temperature reflux condenser through a valve. The autoclave was also connected to a flask containing 74 g. of ethylene oxide. The ethylene oxide was distilled into the reaction mixture while it was being agitated vigorously at a temperature held between 25 and 30° C. In about an hour and a half all the ethylene oxide had been distilled over and the autoclave was closed but agitation was continued for a total of 4 days. Any undissolved Quso was filtered on a Buchner funnel with a filter paper and carbon black. The product was designated as solution A.

Part of solution A was concentrated in vacuo at 40° C. (136 grams of water were removed from a total of 168 grams) leaving a very viscous, clear, slightly yellowish solution B. This solution B was then further evacuated at 43° C. and 5½ more grams of water were removed, leaving 27.3 grams of a very viscous, clear oil. Most of this oil (C) dissolved very quickly in methanol and residual silica was filtered out as before. Solutions of various concentrations in methanol could be obtained by distillation.

Because of the interference of the silicate, it was necessary to analyze these mixtures by a rather complex procedure. An excess of 2 N HCl was added, precipitating out all the $SiO_2$ and converting the amine to the chlorides. This mixture was then diluted with water and the silica was filtered out. The amine chlorides were titrated electrometrically with standardized alakli such as 0.2 N sodium hydroxide. It was thus possible to differentiate between different amines. By this means it was found that oil, such as C, contains 31.2% of quaternary ammonium ion calculated as $N(C_2H_4OH)$ and 9.5% of triethanolamine. By treatment with cation and anionic exchanges it was found that all the organic groups were attached to amines and that, therefore, a high molecular weight ethylene oxide compound was involved which may have a molecular weight of 458. On this basis the oil was found to contain 73.65% of quaternary ion, 15.15% of $SiO_2$ and 9.47% of triethanolamine.

Another reaction using Ludox LS, 222 grams, was carried out with 24 grams of aqueous ammonia and 74 grams of ethylene oxide. The Ludox LS contains 30% colloidal silica with a ratio by weight of $SiO_2/Na_2O$ of 285; viscosity at 25° C. 13 cp., a pH at 25° C. of 8.4. The surface area (BET) is 210 m.$^2$/gr. with a particle diameter of 15 m$\mu$.

In carrying out the reaction, the ammonia was mixed with the Ludox in the reaction flask equipped with a stirrer and a thermometer, and the ethylene oxide was distilled into the mixture over a period of about 1 hour. Agitation was continued for about 7 hours more, but the solution remained in the flask overnight. The solution obtained contained 21.0% of quaternary ion, 21.6% of $SiO_2$ and 57.5% of $H_2O$; with the quaternary ion present as $N^+(C_2H_4OH)_4$; 83.1% conversion to this material was obtained. At first there was only 0.24% of crystalloidal silica, and 21.3% of colloidal silica, but after 4 days there was 4.5% crystalloidal silica and in 18 days, 6.8% crystalloidal silica and 14.8% colloidal $SiO_2$.

An oil obtained by distilling the water from this mixture in vacuo at 40° C. was viscous but clear. It contained 43.45% of quaternary ion and 39.85% of $SiO_2$.

UTILITY

The reactions of these crystals indicate their useful applications. For instance, dry mixtures of an isolated, undenatured soy protein known as Buckeye Protein and sold by the Buckeye Cotton Oil Co., Memphis, Tennessee, are easily prepared by mechanical mixing with the sodium tetraethanolammonium silicate of my invention. Such dry solid mixtures were stable in closed tubes for over 7 months. The mixtures are almost immediately soluble in water and when dissolved in water at the right concentrations, they perform very well as adhesives for laminating paperboard. A specific example is a dry mixture of 29 lbs. of Buckeye Protein and 32 lbs. of sodium tetraethanolammonium silicate having a composition of $1M_2O:1.4N^+(C_2H_4OH)_4:3.8SiO_2:11H_2O$ ($1M_2O:0.7$ quaternary ammonium oxide:$3.8SiO_2:11H_2O$) dissolved in 278 lbs. of water. The silicate dissolved instantly at room temperature forming a dispersion of the protein having a pH of 11.2 after one hour and 11.0 after six days. The viscosity at 1 hour was 14 cp. and 8 cp. after six days. *Neither the odor nor the appearance changed in three weeks.* This adhesive mixture has, therefore, a number of advantages over the ordinary sodium silicate-soy-protein adhesive composition in which an odor is likely to be developed in a few days and the viscosity is likely to deteriorate badly in one or two days. Cold-set and heat-set bond samples were prepared using corrugated paperboard with the following results:

| Properties | Cold Set, Lbs./12" flute line | Heat Set, Lbs./12" flute line |
| --- | --- | --- |
| Dry Strength | 63.0 | 58.6 |
| ½ Hr. Wet Strength | 4.4 | 5.2 |
| 24 Hr. Wet Strength | 7.2 | 8.2 |
| 24 Hr. Soaking and Redry | 58.9 | 53.6 |

It is to be noted that the redried strengths are equivalent to those which are obtained with a normal silicate undenatured protein adhesive. This mixture has advantages over the ordinary silicate mixture in that it is a dry combination which is readily dispersed to an adhesive at a higher dilution than the normal adhesive and with a working life measured in weeks rather than hours.

The reaction of alkali on the Buckeye Protein was studied by determination of free amino groups as a function of aging using the Van Slyke determination of nitrogen. With caustic soda (NaOH) the number of available amino groups increases very rapidly with time and levels off after about 8 days. The mixture still smells strongly of ammonia. With the "N" sodium silicate solution sold by the Philadelphia Quartz Company having a specific gravity of 41° Baume and a weight percent ratio of $1Na_2O:3.22SiO_2$, the determinable amino groups decrease slightly in the first few days and then increase steadily although the rate of increase is much less than the rate with free caustic. Thus the sodium silicate has some stabilizing effect on the protein and the mixture does not have much of an ammoniacal odor. With the sodium tetraethanolammonium silicate, however, the increase in free amino groups is very low and practically constant over a period of 8 days and no change in odor develops. Thus the organic silicate has an even better stabilizing effect than does the sodium silicate, although the pH is practically the same for all three mixtures.

A thick adhesive mixture of Buckeye Protein and water was prepared and samples were retained with dosages of 50 p.p.m. to 2000 p.p.m. of sodium tetraethanolammonium silicate. These samples were all seeded with spoiled protein solution in order to speed up the formation of odor. However, none of the samples developed such an odor during nine days of storage. This does not necessarily indicate that my sodium tetraethanolammonium silicate is either a bactericide or has bacteristatic action. I believe that the tetraethanolammonium silicate stabilizes the protein in such a condition that it cannot be acted upon by the bacteria present.

The quaternary ammonium sodium silicates are also useful as setting agents for refractories which are quite resistant to boiling water.

My quaternary ammonium alkali silicates can also be used in detergent mixtures with polyphosphates such as tetrapotassium pyrophosphate forming a liquid detergent. Mixtures were prepared using a 45% solution of $K_4P_2O_7$ obtained from Westvaco Chemical Co. The order of mixing is usually sodium tetraethanolammonium silicate, then water, and finally a tetrapotassium pyrophosphate. However, it was demonstrated that the phosphate and the organic silicate could be reversed in this mixing procedure. These compounds were compatible over a range of 5 to 25% of the organic silicate and 40 to 5% $K_4P_2O_7$.

Solutions of the sodium tetraethanolammonium silicates have gel time characteristics similar to the ordinary sodium silicate solutions. They may thus be used to form coagulant aids in the coagulation of raw waters with such materials as alum, etc.

These sodium tetraethanolammonium silicates have specific gravity, viscosity and pH characteristics quite similar to those of the alkali metal silicates. The following table gives some representative data:

|  | A | B | C | "N"[1] |
|---|---|---|---|---|
| Percent $Na_2O+K_2O$ (as $Na_2O$) | 2.31 | 1.98 | 2.85 | 8.90 |
| Percent $N+(C_2H_4OH)_4$ | 10.83 | 11.30 | 7.94 | ------ |
| Percent $SiO_2$ | 19.77 | 17.88 | 20.63 | 28.70 |
| Specific Gravity | ------ | 1.191 | 1.224 | 1.394 |
| Viscosity (cp. at 20° C.) | 215 | 59 | 9.4 | 180 |
| pH | ------ | ------ | 11.0 | 11.3 |
| Clarity | (2) | (2) | (3) | (3) |

[1] "N" sodium silicate.
[2] Clear.
[3] Opalescent.

The sodium tetraethanol ammonium silicates in this table were all high ratio products. Sample A was made using Quso FF. The organic silicate was crystallized and separated from the final solution.

Sample B was prepared in the normal way using Baker's Analyzed Silica to increase the silica content.

Sample C was prepared using a colloidal silicate solution, Ludox LS (see Example 21) from duPont de Nemours, Inc., as the source of extra silica. In this product about half of the final silica was colloidal rather than crystalloidal, as in the samples A and B, although immediately after the reaction occurred 63% of the silica was crystalloidal.

In solutions with much higher total solids content my sodium tetraethanolammonium silicate may form solutions which are quite viscous. For instance, one containing 45% solids with 19.4% $SiO_2$ reached a viscosity of 2,850 cp. at 20° C. and a specific gravity of 1.309.

When freshly polished nails are allowed to stand in pure distilled water, large amounts of rust form in a few days. However, if 1% of the sodium tetraethanolammonium silicate is added to distilled water, a polished nail will not be attacked for a period of six months or more. It is to be expected that these organic silicates would likewise be useful in boiler water, ore flotation, tanning, dyeing, printing, coatings, textile assistance, fungicides, bactericides, coagulation aids, etc.

What is claimed is:
1. A compound having the formula:

$$M_2O \cdot X(N_nR_p{}^s)_2O \cdot YSiO_2 \cdot ZH_2O$$

wherein:
M represents at least one alkali metal;
X is between about 0.5 and 1.5;
n indicates the number of nitrogen atoms and is a small integer less than 10;
R represents an organic radical that forms an NR base selected from the group consisting of alkylamines, alkanolamines, heterocyclic amines and cyclic amines which produce solutions with a pH of at least 9;
p is equal to the number of R groups and is at least 4 and up to 4n;
s is an integer from 1 to p indicating the number of different types of R groups;
Y is between 2 and 10;
Z is between 1 and 40.

2. The method of preparing the compounds set forth in claim 1 which comprises reacting together ammonium hydroxide, an aqueous alkali metal silicate and an alkylene oxide at a temperature between about 25° and 150° C. for a reaction time of 2–20 hours, crystallizing and recovering the crystallized product.

3. A method according to claim 2 wherein said alkylene oxide is ethylene oxide.

4. A pseudo-cubic, anisotropic crystalline compound having the formula $$1Na_2O:0.7[N(C_2H_4OH)_4]_2O:3.8SiO_2:11H_2O$$

5. A crystalline compound having the formula $$1Na_2O:0.3[N(C_2H_4OH)_4]_2O:3.3SiO_2:H_2O$$

References Cited by the Examiner

UNITED STATES PATENTS

| 2,137,314 | 11/1938 | Ulrich et al. | 260—567.6 X |
| 2,618,606 | 11/1952 | Schaeffer | 252—137 |
| 2,625,515 | 1/1953 | Wittwer | 252—137 |
| 2,689,245 | 9/1954 | Merrill | 260—448.8 |
| 2,765,307 | 10/1956 | Schmidle | 260—247.7 |
| 2,784,106 | 3/1957 | Christian et al. | 106—154 |
| 2,839,558 | 6/1958 | Kirkpatrick et al. | 260—448.8 |
| 2,844,482 | 7/1958 | Moskey | 106—154 |
| 2,873,282 | 2/1959 | McClellan | 260—247.7 |

FOREIGN PATENTS

| 512,611 | 7/1952 | Belgium. |
| 335,526 | 2/1959 | Switzerland. |

NICHOLAS S. RIZZO, *Primary Examiner.*

I. MARCUS, *Examiner.*

A. M. ESTERLITZ, J. W. MOLASKY, J. TOVAR, *Assistant Examiners.*